United States Patent
Gerner

(10) Patent No.: US 8,668,763 B2
(45) Date of Patent: *Mar. 11, 2014

(54) APPARATUS FOR PERVAPORATION CONTROL IN LIQUID DEGASSING SYSTEMS

(75) Inventor: Yuri Gerner, Mendota Heights, MN (US)

(73) Assignee: IDEX Health & Science LLC, Rohnert Park, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/356,839

(22) Filed: Jan. 24, 2012

(65) Prior Publication Data

US 2012/0240762 A1   Sep. 27, 2012

Related U.S. Application Data

(63) Continuation-in-part of application No. 13/172,133, filed on Jun. 29, 2011, now Pat. No. 8,440,003, which is a continuation-in-part of application No. 13/072,422, filed on Mar. 25, 2011, now Pat. No. 8,430,949.

(51) Int. Cl.
*B01D 53/22* (2006.01)
*B01D 19/00* (2006.01)
*B01D 61/36* (2006.01)

(52) U.S. Cl.
USPC ............... 95/23; 95/19; 95/46; 96/6; 96/7; 96/8; 96/10; 96/193; 96/421; 96/422; 210/640; 417/44.2; 138/40

(58) Field of Classification Search
USPC ............ 96/4, 6, 7, 8, 10, 193, 380, 388, 417, 96/421, 422; 95/19, 45, 46, 23; 210/640; 417/44.2; 138/37, 40
See application file for complete search history.

(56) References Cited

U.S. PATENT DOCUMENTS

| | | |
|---|---|---|
| 5,013,436 A | 5/1991 | Lee et al. |
| 5,139,677 A | 8/1992 | Pasternak |
| 5,160,046 A | 11/1992 | Pasternak |
| 5,173,189 A | 12/1992 | Hoshi et al. |
| 5,205,844 A | 4/1993 | Morikawa |
| 5,266,208 A | 11/1993 | Stahly et al. |
| 5,298,669 A | 3/1994 | Healy et al. |
| 5,448,062 A | 9/1995 | Cooks et al. |
| 5,538,640 A | 7/1996 | Wiimans et al. |
| 5,554,286 A | 9/1996 | Okamoto et al. |
| 5,670,051 A | 9/1997 | Pinnau et al. |
| 5,711,882 A | 1/1998 | Hofmann et al. |
| 5,814,134 A | 9/1998 | Edwards et al. |
| 5,976,226 A | 11/1999 | Bastian et al. |
| 6,017,439 A | 1/2000 | Gannon |
| 6,113,797 A | 9/2000 | Al-Samadi |
| 6,248,157 B1 | 6/2001 | Sims et al. |

(Continued)

FOREIGN PATENT DOCUMENTS

EP   0 423 949   4/1991

*Primary Examiner* — Jason M Greene
(74) *Attorney, Agent, or Firm* — Haugen Law Firm PLLP

(57) ABSTRACT

A liquid degassing apparatus is arranged to prevent pervaporated solvent cross-contamination by counteracting liquid vapor pervaporation flow. Liquid vapor pervaporation cross-contamination among a plurality of degassing modules is counteracted with specifically configured volumes and bleed inlet flow to conduits fluidly coupling permeate sides of said plurality of degassing chambers.

18 Claims, 7 Drawing Sheets

(56) References Cited

U.S. PATENT DOCUMENTS

| | | |
|---|---|---|
| 6,440,309 B1 | 8/2002 | Cohen |
| 6,494,938 B2 | 12/2002 | Sims et al. |
| 6,838,002 B2 | 1/2005 | Zeiher et al. |
| 7,686,590 B2 * | 3/2010 | Ishii et al. .......................... 96/6 |
| 8,440,003 B2 * | 5/2013 | Gerner et al. ....................... 96/6 |
| 2001/0035093 A1 | 11/2001 | Yokota |
| 2001/0037731 A1 | 11/2001 | Sims et al. |
| 2007/0086923 A1 | 4/2007 | Li et al. |
| 2008/0006578 A1 | 1/2008 | Sims et al. |
| 2008/0163752 A1 | 7/2008 | Williams et al. |
| 2011/0214571 A1 | 9/2011 | Berndt |

* cited by examiner

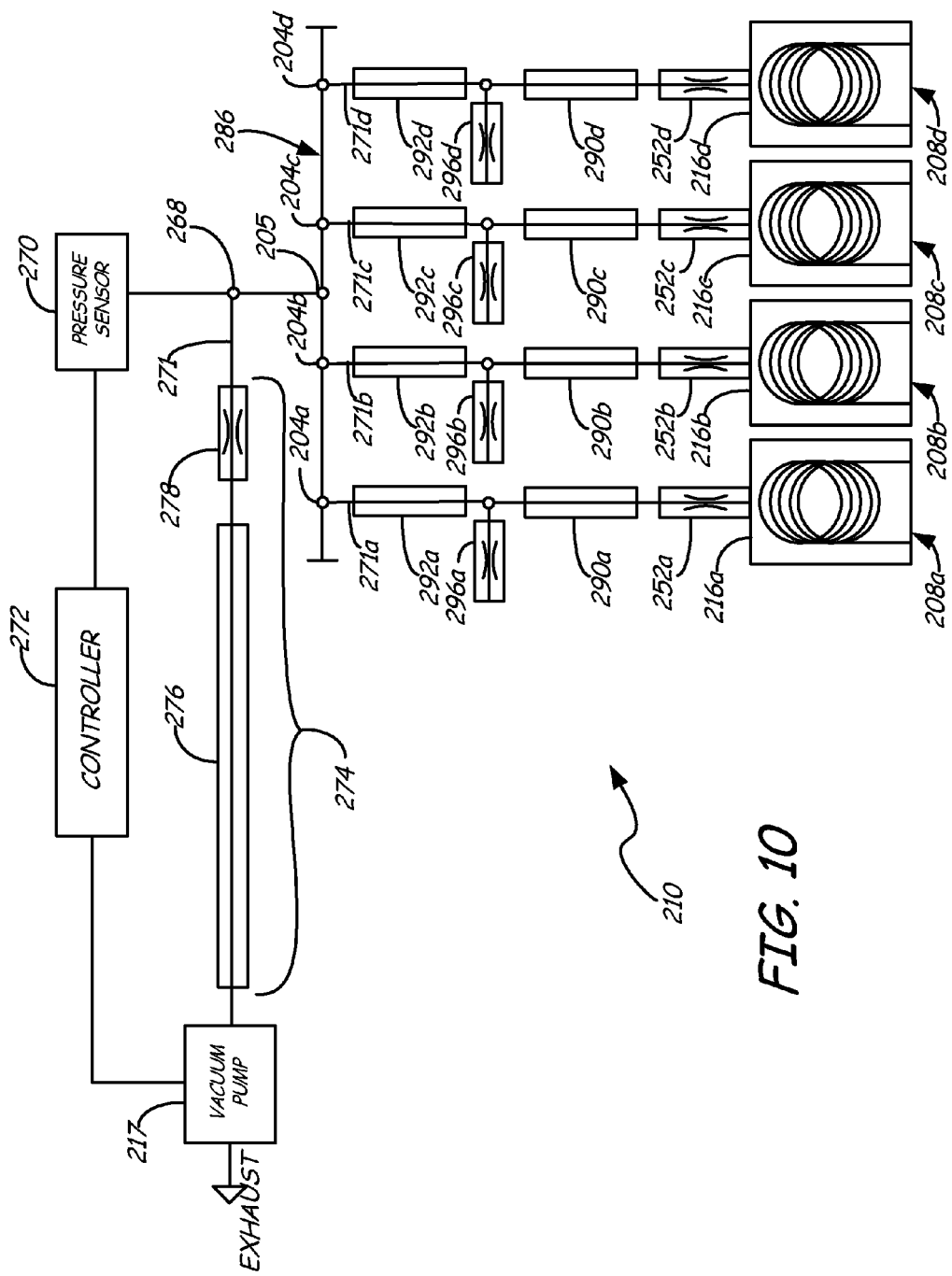

APPARATUS FOR PERVAPORATION CONTROL IN LIQUID DEGASSING SYSTEMS

CROSS REFERENCE TO RELATED APPLICATIONS

The present application is a continuation in part of U.S. patent application Ser. No. 13/172,133, filed Jun. 29, 2011 now U.S. Pat. No. 8,440,003 and entitled "APPARATUS FOR PERVAPORATION CONTROL IN LIQUID DEGASSING SYSTEMS", which is itself a continuation in part of U.S. patent application Ser. No. 13/072,422, filed Mar. 25, 2011 now U.S. Pat. No. 8,430,949 and entitled "APPARATUS FOR PERVAPORATION CONTROL IN LIQUID DEGASSING SYSTEMS", the contents of such applications being incorporated herein in their entirety.

FIELD OF THE INVENTION

The present invention relates to liquid degassing systems generally, and more particularly to a liquid degassing apparatus that is specifically arranged to minimize pervaporation in a degassing chamber. The apparatus of the present invention may be particularly adapted for control of pervaporation in degassing systems utilized in liquid chromatography applications.

BACKGROUND OF THE INVENTION

Solvent pervaporation through a membrane is a well known phenomenon that has been harnessed in membrane separation applications. For example, the prior art is rich with examples of the use of solvent pervaporation through a membrane for the purpose of concentrating relatively low vapor pressure components on a retentate side of the membrane. In addition, distillation operations utilizing pervaporation through a membrane have been performed to selectively recover solvent components on the permeate side of the membrane.

While the beneficial aspects of pervaporation have long been known and utilized in purposeful solvent separation processes, such pervaporation characteristics can have significant negative effects in mixed-solvent applications wherein the relative concentrations of the respective solvents is desired to be known and/or constant. A particular example of such a mixed-solvent application is in liquid chromatography systems, wherein mobile phases of more than one solvent are used. It has been recognized by the Applicants, however, that changes to the relative concentrations of the mobile phases can occur over time, thereby negatively affecting the accuracy of chromatographic analysis.

Pervaporation effects are particularly damaging to analytical accuracy in chromatographic systems utilizing relatively low through-put mobile phase volumes, or in instances wherein the chromatographic instrumentation is only periodically operated without complete flushing of supply lines between each operation. For example, systems that utilize mobile phase flow rates of on the order of nanoliters or microliters per hour are at risk of having the relative concentrations of the solvents making up the mobile phase being substantially modified during analyte transportation through the chromatographic instrumentation.

In particular, liquid chromatography systems typically employ degassing chambers in which the liquid mobile phase is exposed to a degassing environment through a gas-permeable, liquid-impermeable membrane. Such a degassing environment may be, for example, relatively low absolute pressure maintained by evacuation pumps, or relatively low target material partial pressures in a sweep fluid passed through a permeate side of a degassing chamber. Typically, degassing operations have been arranged and controlled to maximize degassing performance on the mobile phase passing through the degassing chamber. To do so, vacuum pumps are typically programmed to maintain relatively low absolute pressures on the permeate side of the membrane, or, in the cases of a sweep fluid, a sweep fluid containing little or no concentration of the targeted gas species being withdrawn from the mobile phase. In both cases, a target gas concentration gradient is maintained to drive target gas transfer through the membrane to the permeate side. A result of maintaining such a large target gas concentration gradient at all times in the degassing chamber can be pervaporation. Specifically, relatively long residence time of mobile phase within the degassing chamber having a permeate side maintained at the conditions described above has a tendency to cause a change in relative solvent concentrations as a result of pervaporation through the membrane of relatively higher vapor pressure solvent components. As a consequence, the mobile phase on the retentate side of the degassing chamber can become concentrated in relatively lower vapor pressure component materials, particularly if such mobile phase has a relatively high residence time within the degassing chamber, or if the permeate side of the degassing chamber is conducive to ongoing pervaporative effects.

It is therefore an object of the present invention to provide an apparatus for controlling pervaporation of a mobile phase having two or more component materials through a membrane.

It is another object of the present invention to provide an apparatus for establishing an environment on the permeate side of a membrane that is effective in limiting pervaporation through the membrane of a mobile phase having two or more component materials.

It is a further object of the present invention to provide an apparatus for attenuating pressure oscillations in a vacuum degassing system.

It is a still further object of the present invention to inhibit cross-contamination of pervaporated solvent among a plurality of distinct degassing chambers in a vacuum degassing system.

SUMMARY OF THE INVENTION

By means of the present invention, pervaporated solvent cross-contamination may be substantially eliminated by counteracting a pervaporated solvent backflow developed in non-suction periods of a vacuum pump cycle. Counteraction may be in the form of an added volume downstream of a degassing chamber and/or air/gas flow driven in a direction opposite of the potential backflow. In a negative pressure degassing environment, counteracting air flow may be driven by pressure differential in the system with respect to ambient.

In one embodiment, a liquid degassing apparatus of the present invention includes a plurality of degassing modules for degassing respective liquid compositions, each of the degassing modules including a chamber separated by a gas-permeable, liquid-impermeable membrane into a permeate side and a retentate side, wherein the retentate sides of the chambers are liquidly disconnected from one another. The apparatus further includes a manifold fluidly connecting the permeate sides of the chambers through outlet conduits individually extending between the manifold and respective vacuum ports in fluid communication with the permeate sides of the chambers, wherein the manifold further fluidly connects the outlet conduits with the main degassing line at a connection. A vacuum pump of the apparatus is fluidly coupled to the main degassing line for evacuating the permeate sides of the chambers to a pressure set point. The apparatus further includes an air vent permitting air flow into the apparatus between the connection and the chambers at an inflow rate that is equal to or greater than a combined average backflow rate of the plurality of degassing modules, but not exceeding a maximum capacity flow rate defining a maximum capacity of the vacuum pump for maintaining the pressure set point.

In another embodiment, a method for controlling liquid pervaporation in a liquid degassing system includes delivering liquid compositions to retentate sides of chambers within a plurality of degassing modules, wherein a first liquid composition delivered to a first chamber is different from a second liquid composition delivered to a second chamber. A vacuum pump fluidly coupled to respective permeate sides of the chambers is operated to evacuate the permeate sides of the chambers to a pressure set point that results in a liquid vapor pervaporation flow through a respective membrane in at least one of first and second of the plurality of chambers. The method further includes counteracting the liquid vapor pervaporation flow to prevent infiltration of the pervaporation flow into another of the chambers.

BRIEF DESCRIPTION OF THE DRAWINGS

FIG. 10 is a schematic view of a liquid degassing apparatus of the present invention.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
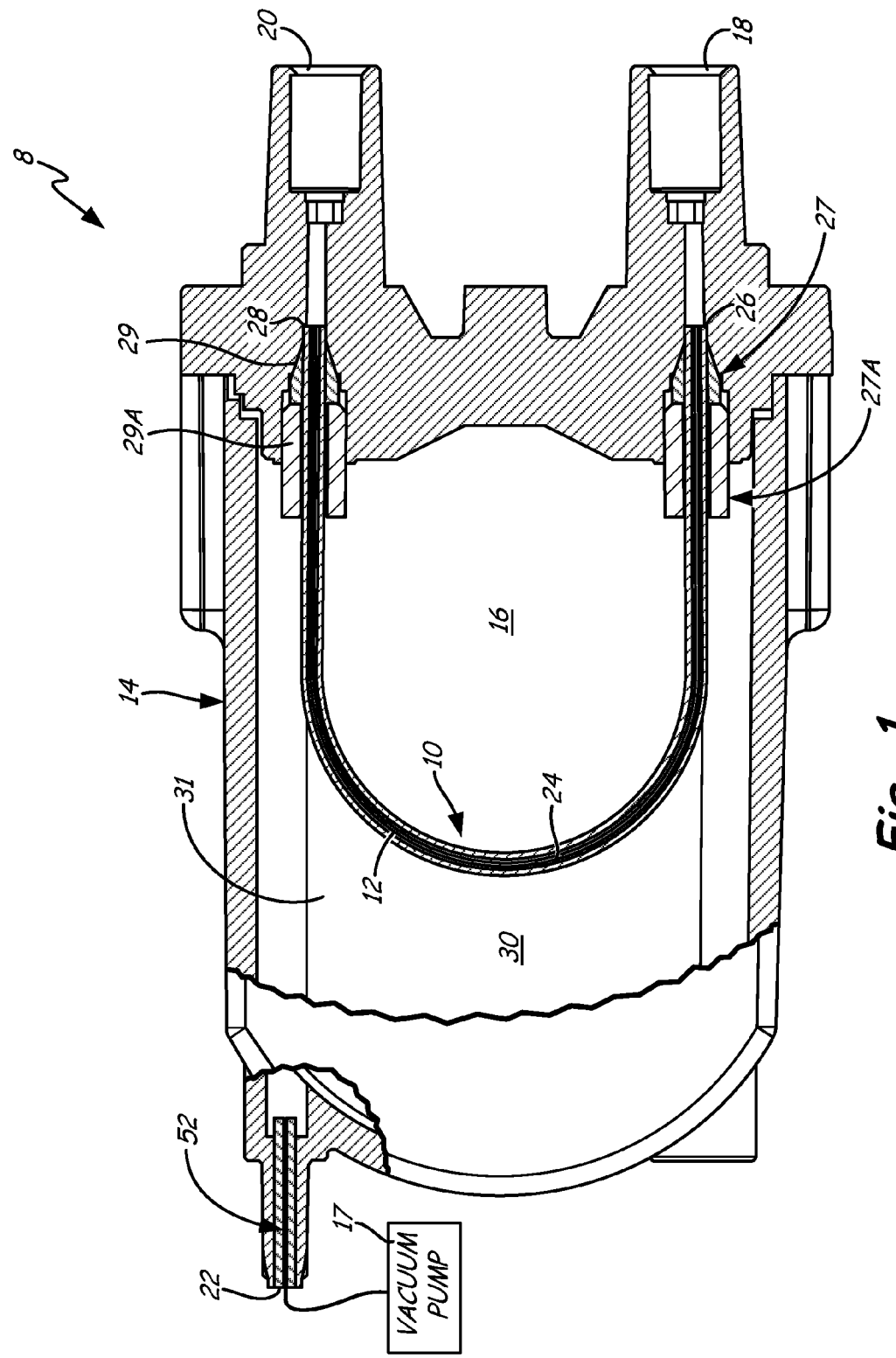
FIG. 1 is a schematic illustration of a liquid degassing apparatus of the present invention.

With reference now to the drawing figures, and first to FIG. 1, a pervaporation control system 10 in a liquid degassing apparatus 8 is arranged to provide a minimal volume pervaporation control space 12, as will be described in greater detail hereinbelow. Liquid degassing apparatus 8 includes a body 14 which defines a chamber 16 through which pervaporation control system 10 operably extends. Body 14 may comprise one or more component parts, and defines a liquid inlet 18 and a liquid outlet 20. Body 14 further defines a vacuum port 22 which establishes fluid communication between chamber 16 and a vacuum pump 17 coupled to port 22.

Body 14 may be fabricated from a non-porous, non-absorptive material such as polyphenylene sulfide, PEEK, non-porous metal, or non-porous glass. Such materials inhibit solvent pervaporation through an exterior wall thereof. In the embodiment illustrated in FIG. 1, body 14 defines a vacuum chamber 16 that is separated into a permeate side 30 and a retentate side 32, with the retentate side 32 of chamber 16 being in liquid communication with liquid inlet and outlet 18, 20 at liquid inlet connection 26 and liquid outlet connection 28, respectively. Permeate side 30 of chamber 16 is in fluid communication with vacuum port 22. In the embodiment illustrated in FIG. 1, membrane 24 is in the form of a tube for conveying liquidous material through chamber 16 from liquid inlet connection 26 to liquid outlet connection 28. As such, retentate side 32 of membrane 24 is the lumen of the tube formed by membrane 24, and permeate side 30 is the space of chamber 16 external to the tubular membrane 24.

Membrane 24 may be disposed in chamber 16 in a variety of configurations, and being limited only by the requirement that membrane 24 effectively contain the liquid portion of a mobile phase entering chamber 16 at inlet connection 26 on a retentate side of membrane 24. Accordingly, membrane 24 may be arranged in any suitable configuration for separating chamber 16 into a permeate side 30 and a retentate side 32, with the retentate side of chamber 16 being in liquid communication with liquid inlet and outlet connections 26, 28, and the permeate side 30 of chamber 16 being in fluid communication with vacuum port 22.

Membrane 24 may preferably be gas-permeable, liquid-impermeable so as to substantially inhibit liquidous material from passing therethrough. Accordingly, membrane 24 may be fabricated from a variety of materials, including flouropolymers such as PTFE, ePTFE, and perfluorinated copolymer available from E.I. du Pont de Nemours and Company under the trade name Teflon AF®. An example construction of a tubular membrane in a vacuum degassing chamber is described in U.S. Pat. No. 6,248,157, which is incorporated herein by reference.

While membrane 24 substantially prevents the permeation of liquidous material therethrough, it is understood that solvent vapor may diffuse through the wall of membrane 24 to permeate side 30 of chamber 16. As described above, solvent vapor diffusion through membrane 24 may be driven by differential partial pressures of the solvent vapor as between the retentate and permeate sides of membrane 24. In the case of liquid degassing systems, mixed-solvent mobile phase may have disproportionate pervaporation rates among each solvent in the mobile phase. Consequently, it is desired to minimize solvent pervaporation across membrane 24, so as to maintain consistent and accurate solvent blends in the mobile phase.

Henry's Law of Partial Pressure controls the operational parameters in causing gaseous species in the liquid mobile phase to migrate through gas-permeable membrane 24 to a permeate side 30 of chamber 16. In particular, to drive migration across the membrane, permeate side 30 exhibits a lower relative concentration or partial pressure of the target gaseous species than that found in the liquid mobile phase. For liquid chromatography applications, the critical gaseous species concentration in the liquid mobile phase is the maximum target gas species solute concentration sustainable in the mobile phase without outgassing. For example, methanol and water can each individually hold up to 38% of air without outgassing in any mixture combination of the two solvents. As such, the maximum pressure at the permeate side 30 for degassing air from a methanol/water analyte may be calculated by the following relationship:

$$P_{degas} = (0.38)(\text{ambient atmospheric pressure})$$

The ambient atmospheric pressure value must take into account known decreases in pressure introduced by the system. For example, flow restrictions between the mobile phase supply vessels and the mobile phase pump must be deducted from ambient atmospheric pressure in order to calculate an accurate maximum pressure at permeate side 30 allowable in order to maintain the mobile phase with a gas concentration sufficiently low to prevent outgassing.

In some applications, however, such a pressure value calculated at a level only to prevent outgassing of the mobile phase is insufficient to adequately degas the mobile phase. As such, the gas pressure at permeate side 30 required to achieve desired degasification of the mobile phase is likely to be assessed for each set of operating conditions. In general, degassing rate is increased with decreased target gas partial pressure on permeate side 30 of chamber 16. To effectuate such an environment, permeate side 30 of chamber 16 may be evacuated to a relatively low total absolute pressure by coupling vacuum port 22 to a vacuum pump 17.

The equilibrium point pressure at permeate side 30 is calculated as the sum of the vapor pressures of each solvent component in the mobile phase. By operation of Dalton's Law, solvent vapor fills a void space to an extent at which its associated partial pressure meets the corresponding solvent vapor pressure, when such void space is exposed to the corresponding solvent. Such an arrangement is present in pervaporation control system 10, wherein only a pervaporation control space 12 is available to be filled with solvent vapor up to the corresponding solvent vapor pressure of a solvent component disposed at a retentate side 32. Pervaporation of the solvents will occur only to the extent that each solvent vapor fills pervaporation control space 12 to a partial pressure equal to its corresponding vapor pressure, at which point further pervaporation ceases. Accordingly, Applicants have determined that pervaporation of liquid mobile phase from retentate side 32 may be limited by minimizing the volume of permeate side 30 of chamber 16, through the establishment of pervaporation control space 12 defined between membrane 24 and a shield member 36, which shield member 36 is disposed in permeate side 30 of chamber 16, and interposed between membrane 24 and vacuum port 22. In this manner, the equilibrium point pressure described above is reached with as little solvent pervaporation as possible. Minimizing the void space defined by pervaporation control space 12 provides a variety of other operational advantages, such as rapid pressure stabilization, low volume requirements, and the like.

In one embodiment, shield member 36 defines pervaporation control space 12 by establishing a solvent vapor permeability barrier in proximity to membrane 24. As a result, shield member 36 may exhibit low solvent vapor permeability, and particularly low permeability to solvent vapors pervaporating from the mobile phase at retentate side 32 of membrane 24. Shield member 36 may therefore exhibit a solvent vapor permeability that is less than the solvent vapor permeability of membrane 24.

In some embodiments, shield member 36 may be fabricated from one or more polymeric materials such as FEP, PEEK, Tefzel™, or other suitable materials. In the illustrated embodiment, shield member 36 is formed as a tube which surrounds tubular membrane 24. Shield member 36 may concentrically or nonconcentrically surround membrane 24. Shield member 36 may surround tubular membrane 24 to define a substantially closed pervaporation control space 12 between membrane 24 and shield member 36. In some embodiments, shield member 36 may surround tubular membrane 24 as tubular membrane 24 extends between inlet connection 26 and outlet connection 28. Shield member 36 may therefore extend continuously from inlet connection 26 to outlet connection 28, such that pervaporation control space 12 is defined continuously from inlet connection 26 to outlet connection 28.

Shield member 36, however, may be provided in a variety of configurations to establish a desired pervaporation control space 12. In the illustrated embodiment, pervaporation control space 12 is defined continuously from inlet connection 26 to outlet connection 28. In other embodiments, however, pervaporation control space 12 may be defined only at one or more distinct locations in proximity to membrane 24, such as at locations between inlet connection 26 and outlet connection 28. Shield member 36 may be provided in configurations which are not tubular to suitably define pervaporation control space 12 between membrane 24 and shield member 36.

In one particular embodiment, tubular membrane 24 may have an inside diameter "$X_1$" of 0.011 in., and a wall thickness of 0.005 in. Shield member 36 may surround, concentrically or otherwise, tubular membrane 24 with an inner diameter "$X_2$" of 0.030 in, and an outside diameter "$X_3$" of 0.062 in. In such an arrangement, therefore, an average distance between membrane 24 and inner wall 37 of shield member 36 is about 0.007 in. In typical embodiments, inner wall 37 of shield wall 36 may be spaced from membrane 24 by less than about 0.03 in. in defining pervaporation control space. In some embodiments, pervaporation control space 12 assumes a volume between membrane 24 and shield member 36 that is not greater than about 30× the volume defined by retentate side 32 of chamber 16. It has been discovered by the Applicants that, at a ratio of less than about 30:1 (volume of pervaporation control space:volume of retentate side), pervaporation of liquid at retentate side 32 may be limited to an extent which permits relative concentration ranges of a mixed solvent system within an acceptable error range of chromatographic analysis. The ratio described above, therefore, represents an understanding by the Applicants of empirical evidence of suitably minimized pervaporation. It has been further discovered, however, that such ratio may preferably be substantially less than 30:1, such as less than about 10:1, and even more preferably less than about 3:1. To provide a desirably functional pervaporation control space, both for controlling solvent pervaporation across membrane 24 and for facilitating degassing of the solvent, the relative volume ratio of the pervaporation control space to the spaced defined on the retentate side of membrane may be at least about 1:1. Relative volumes as between pervaporation control space 34 and retentate side 32 may be established to suit the particular parameters of an operating system and its associated materials and operating conditions.

It is also to be understood that the relative volume ratios described above may not be pertinent for arrangements in which shield member 36 and/or tubular membrane 24 are not substantially tubular. Accordingly, it is to be understood that pervaporation control space 12 may be defined as a limited space between membrane 24 and shield member 36. In typical embodiments, an average distance between membrane 24 and inner wall 37 of shield member 36 may be at least about 0.001 in, and may be between about 0.001 in and about 0.03 in. Such a range has been determined by the Applicants to simultaneously facilitate a meaningful limitation on solvent pervaporation through membrane 24, and adequate degassing of the solvent at retentate side 32 of membrane 24.

In order to permit degassing of the liquid mobile phase at retentate side 32 of membrane 24, permeate side 30 of chamber 16 may be dynamically controlled to establish and maintain sufficiently low partial pressures of the target species for gaseous removal from the liquid mobile phase. In the context of the vacuum degassing arrangement illustrated in the Figures, therefore, permeate side 30 of the chamber 16 may be fluidly coupled to vacuum port 22, such that a vacuum pump may evacuate permeate side 30 to an extent sufficient to establish and maintain a target gas partial pressure that effectuates degassing of the liquid mobile phase. Such fluid connection extends to membrane 24, so that gas removed from the liquid mobile phase through gas-permeable membrane 24 may be evacuated out from chamber 16 through vacuum port 22.

Figure 2:
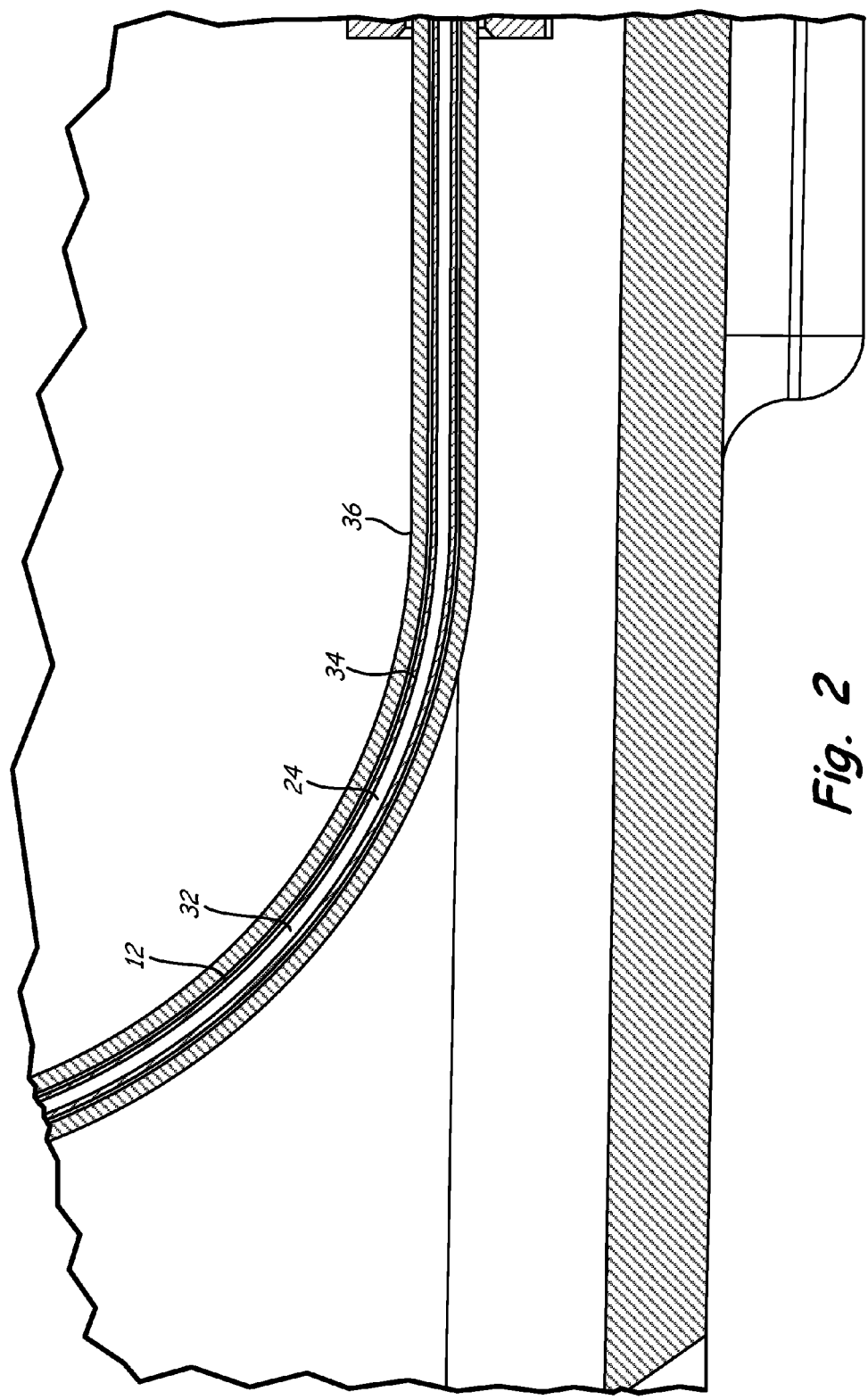
FIG. 2 is an enlarged view of a portion of the schematic illustration of FIG. 1.
Figure 3:
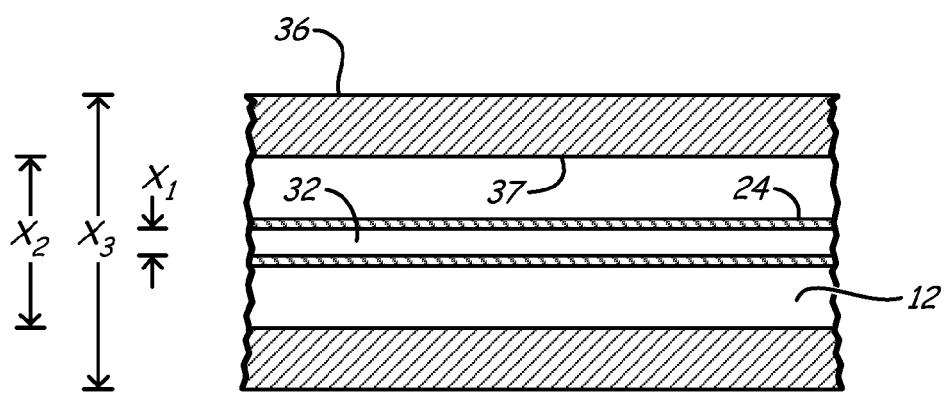
FIG. 3 is an enlarged view of a portion of the schematic illustration of FIGS. 1 and 2.
Figure 4:
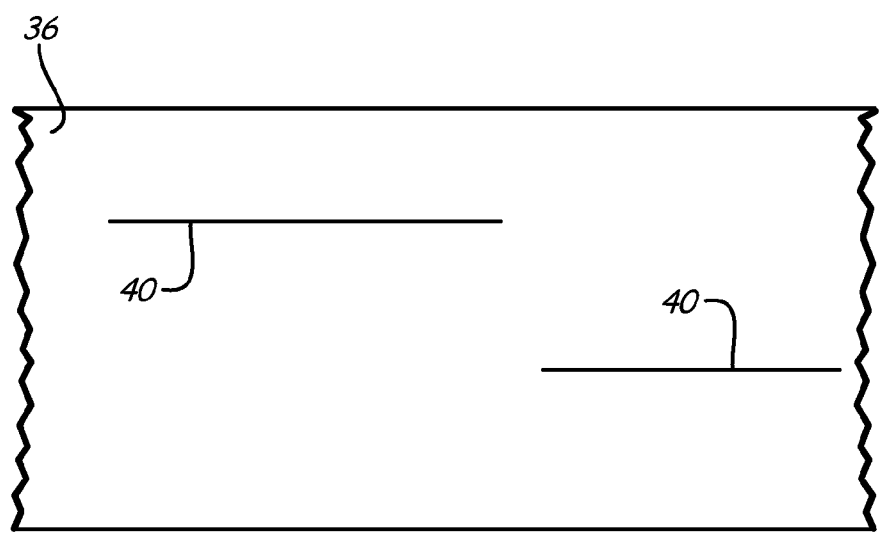
FIG. 4 is a schematic view of a portion of the liquid degassing apparatus of the present invention.
Figure 5:
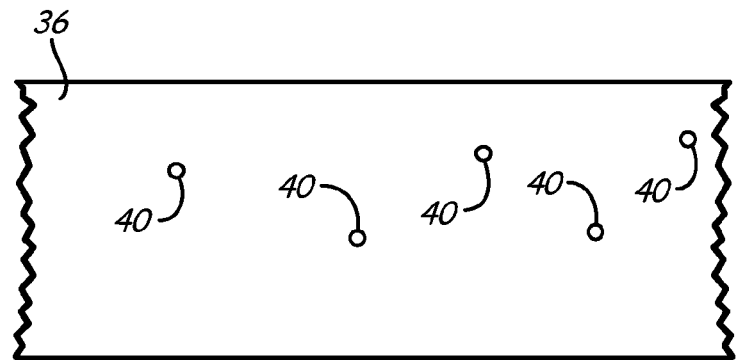
FIG. 5 is a schematic view of a portion of the liquid degassing apparatus of the present invention.
Figure 6:
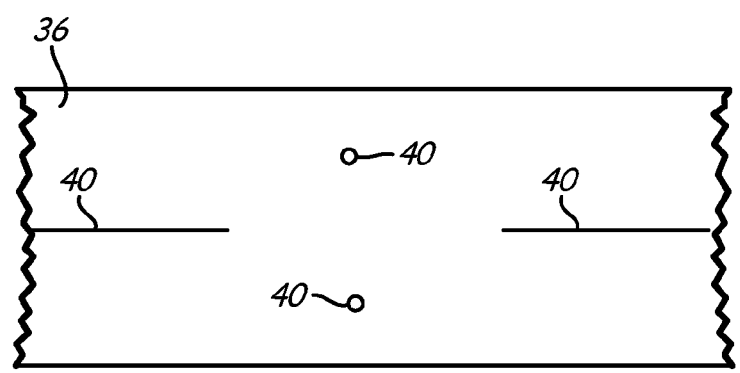
FIG. 6 is a schematic view of a portion of the liquid degassing apparatus of the present invention.
Figure 7:
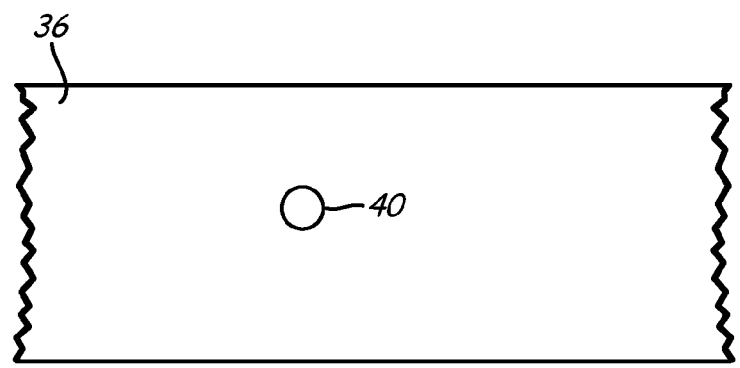
FIG. 7 is a schematic view of a portion of the liquid degassing apparatus of the present invention.

Conventional degassing systems, such as that described in U.S. Pat. No. 6,248,157 establish direct exposure of the permeate side surface of the membrane to a fluid environment that is connected in an unimpeded fashion to a vacuum port outlet (see FIG. 2 of U.S. Pat. No. 6,248,157). The presently described shield member 36 presents a barrier, at least to an extent, for degassed molecules to be removed from chamber 16. Consequently, shield member 36 may be configured to permit limited bypass of gaseous species while maintaining a substantially closed pervaporation control space 12. A number of approaches may be utilized to facilitate removal of degassed molecules from chamber 16. For example, shield member 36 may be provided with one or more apertures 40 which permit limited gas flow therethrough. In the enlarged view of FIG. 4, apertures 40 may be slits formed in the wall of shield member 36. Slits 40 may penetrate at least partially through shield member 36, and preferably establish a pathway for limited gaseous escape through shield member 36. Slits 40 may be provided at shield member 36 in any desired number, size, or arrangement to provide the desired balance of degassed vapor outflow from pervaporation control space 12 and the maintenance of a substantially closed pervaporation control space 12 to limit solvent vapor pervaporation pursuant to Dalton's Law. For example, apertures 40 may be in the form of slits formed longitudinally substantially parallel to a luminal axis of a tubular shield member 36. It has been found by the Applicant that such an arrangement for the one or more apertures 40 in shield member 36 provides for sufficient degassing efficiency without compromising the structural strength of shield member 36. Applicants contemplate, however, that the one or more apertures may be provided any of a number of configurations, including combinations of different configurations. In the example of slits, apertures 40 may be formed longitudinally, transversely, spirally, or any combination thereof to establish the desired degree of gas flow out from pervaporation control space 12. Accordingly, apertures 40 may be in the form of holes, valves, pathways, and the like. FIGS. 5-7 illustrate example alternative embodiments for one or more apertures 40 in shield member 36.

In each of the illustrated embodiments, shield member 36 is adapted to permit limited gas flow at least from pervaporation control space 12 to a chamber space 31 of permeate side 30 that is separated from pervaporation control space 12 by shield member 36. In some embodiments, shield member 36 may be adapted to permit gas flow between pervaporation control space 12 and chamber space 31. It is contemplated that shield member 35 may be variously configured to achieve the limited gas passage from pervaporation control space 12 to chamber space 31. In some embodiments, the one or more apertures 40 in shield member 36 permits gas passage from pervaporation control space 34 to chamber space 31 only upon at least one millimeter Hg absolute pressure differential between pervaporation control space 12 and chamber space 31. In typical such embodiments, therefore, degassing of liquid at retentate side 32 through gas-permeable membrane 24 that is effectuated by a reduced partial pressure of the target gas at permeate side 30 increases the absolute pressure at pervaporation control space 12 due to the "enclosure effect" of shield member 36 in relation to membrane 24. Shield member 36 may be arranged to permit gas passage from pervaporation control space 12 to chamber space 31 only upon reaching a threshold absolute pressure differential, with the absolute pressure at pervaporation control space 12 being greater than the absolute pressure of chamber space 31 by the threshold differential value. As indicated above, such a threshold absolute pressure differential may be at least one mm Hg.

In one particular embodiment of the present invention, apertures 40 may comprise one or more slits substantially longitudinally aligned with a central luminal axis of a tubular shield member 36, wherein the one or more slits are of a width, length, and penetration depth to produce an air flow restriction of between about 10-50 SCCM with an absolute pressure at chamber space 31 of about 100 mm Hg. To accomplish such an airflow restriction, the one or more apertures 40 may penetrate partially or completely through a wall of shield member 36. In one embodiment, for example, a gas passage slit aperture 40 may be produced at shield member 36 by cutting into shield member 36 with a standard razor blade along an axial direction.

In the illustrated embodiment, a tubular shield member 36/membrane 24 assembly may be secured at each of inlet and outlet connections 26, 28 with suitable ferrules 27, 29 which are configured to crimpingly engage upon shield member 36 at inlet and outlet connections 26, 28. Respective nuts 27a, 29a operate conventionally to press ferrules 27, 29 into crimping engagement between body 14 and shield member 36.

To limit air-vapor exchange due to pressure fluctuations within chamber 16 caused by the operation of the vacuum pump coupled to vacuum port 22, a pneumatic filtration device may be established by including a flow restrictor 52 between chamber 16 and the vacuum pump, such as at vacuum port 22. In the illustrated embodiment, flow restrictor 52 is in the form of a capillary tube disposed at vacuum port 22, which capillary tube is suitable for creating a pneumatic pressure oscillation dampener having a time constant that is larger than an oscillation rate of the vacuum pump. The pneumatic pressure oscillation attenuation of flow restrictor 52 may be calculated by the following relationship:

$$A = 1 \div \sqrt{1 + (2\pi \times F \times T)^2}$$

Where:
F=$T_N$–frequency of fluctuations
T=$(V \times 128 \times \mu \times L) \div (\pi \times d^4 \times P)$
V=chamber volume
$\mu$=dynamic viscosity of air
L=restrictor length
d=restrictor inside diameter
P=pressure Flow restrictor 52 is preferably configured to be effective in reducing pressure fluctuations in chamber 16 caused by the reciprocal displacement operation of the vacuum pump. The time constant of flow restrictor 52 and chamber 16 should therefore be larger than the oscillation rate of the positive displacement effected through the reciprocating piston of vacuum pump 17. In a particular embodiment, flow restrictor 52 is configured to permit up to about 1 mm Hg absolute pressure differential thereacross. In one embodiment, flow restrictor 52 is a capillary tube having an inside diameter of 0.01 in, and length of 0.5 in, wherein the volume of chamber 16 is about 28 cm$^3$. Flow restrictor 52 and chamber 16, however, may be provided in a variety of configurations to meet the pneumatic pressure oscillation dampening performance of the present invention.

While flow restrictor 52 may be effective in reducing pressure fluctuations in chamber 16, such pressure fluctuations may nevertheless be imparted upon pressure sensor 70 between flow restrictor 52 and vacuum pump 17. Such pressure oscillations detected by sensor 70 may, without corrective programming to controller 72, cause controller 72 to drive vacuum pump 17 at varying speeds in an effort to maintain a pressure set point in chamber 16. The changing speeds of vacuum pump 17 may exacerbate pressure oscillations, both detected by pressure sensor 70, and within degassing chamber 16. In fact, in a closed-loop control scheme for maintaining a pressure setpoint within degassing chamber 16, the pressure oscillations detected by pressure sensor 70 may drive the system to actually create pressure oscillations within degassing chamber 16 which overcome the dampening properties of flow restrictor 52, thereby potentially leading to undesired pervaporation.

Figure 8:
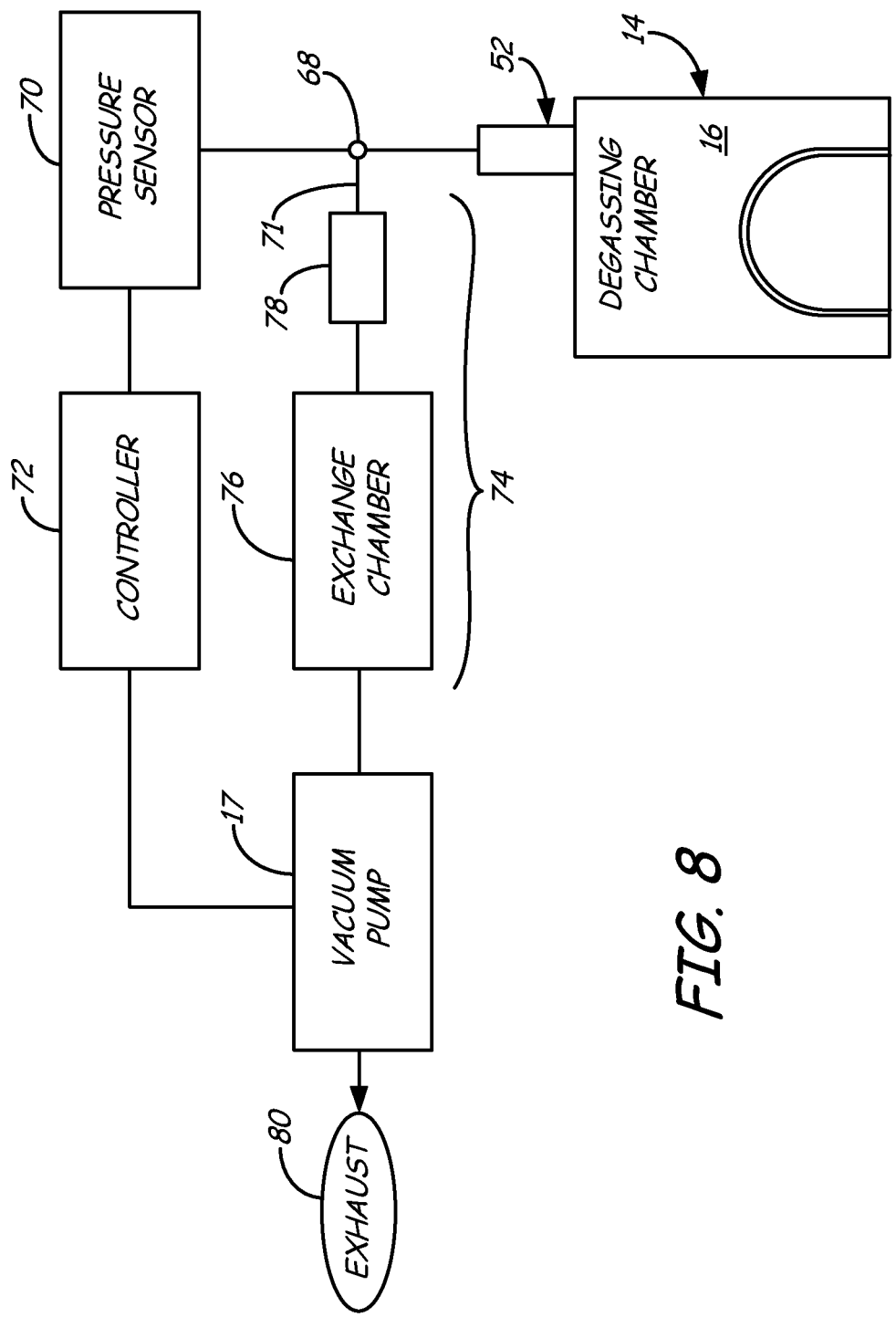
FIG. 8 is a schematic view of a liquid degassing apparatus of the present invention.

To reduce pressure oscillations, both within degassing chamber 16 and at sensing point 68 of pressure sensor 70, a pneumatic filtration apparatus 74 may be operably positioned between vacuum pump 17 and sensing location 68. The pneumatic filtration apparatus 74 includes one or more of a volume exchange chamber 76 and a flow restrictor 78. In the embodiment illustrated in FIG. 8, volume exchange chamber 76 is disposed downstream from flow restrictor 78. However, it is contemplated that the relative positions of exchange chamber 76 and flow restrictor 78 may be reversed, wherein flow restrictor 78 is downstream from exchange chamber 76. For the purposes of this application, the terms "downstream" and "upstream" are intended to refer to the prevailing gas flow direction from degassing chamber 16 to exhaust 80 of vacuum pump 17. Thus, a component disposed "downstream" from another component or location in the pervaporation control system is proximally disposed to exhaust 80 with respect to the other component or location.

Volume exchange chamber 76 and flow restrictor 78 may work individually or in combination to attenuate pressure oscillations upstream from pneumatic filtration apparatus 74. Consequently, the attenuation contribution of each of exchange chamber 76 and flow restrictor 78 may be assigned in the construction of pneumatic filtration apparatus 74 to optimally perform in the respective pervaporation control/degassing system. In one aspect, for example, flow restrictor 78 may be limited in its attenuation contribution by the pressure drop thereacross. Specifically, the pressure drop magnitude across flow restrictor 78 is preferably of a magnitude within desired operating ranges for vacuum pump 17, such that vacuum pump 17 possesses the capability to maintain the pressure setpoint within degassing chamber 16 even through the change in pressure caused by flow restrictor 78. In some cases, flow restrictor 78 is designed to contribute to pressure oscillation attenuation while not significantly increasing the power draw (speed) of vacuum pump 17. In one embodiment, flow restrictor 78 may be a capillary tube with an inside diameter that is substantially smaller than a nominal inside diameter of degassing line 71 coupling degassing chamber 16 to vacuum pump 17. For example, the capillary tube of flow restrictor 78 may have an inside diameter of 0.01 in. and a length of 2 in. However, it is to be understood that capillary tubes of various dimensions, as well as a variety of other configurations or devices may be utilized to achieve the desired flow restriction.

Volume exchange chamber 76 of pneumatic filtration apparatus 74 may be provided as an added "dead space" volume between sensor location 68 and vacuum pump 17. Such volume of exchange chamber 76, as well as the flow restriction of flow restrictor 78, operate individually or in combination to provide pneumatic pressure oscillation attenuation in accordance with the relationship described above. Namely, the attenuation provided by pneumatic filtration device 74 may be calculated with "V" being the volume of exchange chamber 76, and "L" and "d" being the diameter and length dimensions, respectively, of flow restrictor 78. The pressure oscillation attenuation provided by pneumatic filtration apparatus 74 may be at least 10%, and, in some embodiments, at least 50%.

It is contemplated that exchange chamber 76 may be provided in any of a variety of configurations, including a separate chamber body fluidly coupled to degassing line 71, or a widened and/or lengthened degassing line 71. As expressed in the above relationship, the increased volume being pumped by vacuum pump 17, and in some embodiments downstream from sensor location 68, contributes to the attenuation of pressure oscillations within degassing line 71 and degassing chamber 16. In one embodiment, exchange chamber 76 may be in the form of an extended length of degassing line 71 for a total added volume of 5-10 milliliters. Other volumes and configurations for exchange chamber 76, however, are contemplated by the present invention.

Some liquid degassing systems involve a plurality of distinct degassing chambers assigned to degas distinct liquid mobile phase streams. In some cases, such distinct mobile phase streams may contain identical mobile phase compositions. In other cases, however, such mobile phase streams may carry distinct mobile phase compositions. Typically, vacuum degassing of such plurality of degassing chambers is effected through a single vacuum pump fluidly coupled to each of the degassing chambers through a manifold. It has been discovered that pressure oscillations caused by the reciprocating characteristic of the vacuum pump can induce pervaporated solvent from one chamber to be retrogradedly transferred into a different vacuum chamber through the manifold. In particular, increased pressure in the manifold during the non-intake portion of the vacuum pump cycle can cause air and pervaporated solvent to "reverse" course from the manifold into a degassing chamber.

Figure 9:
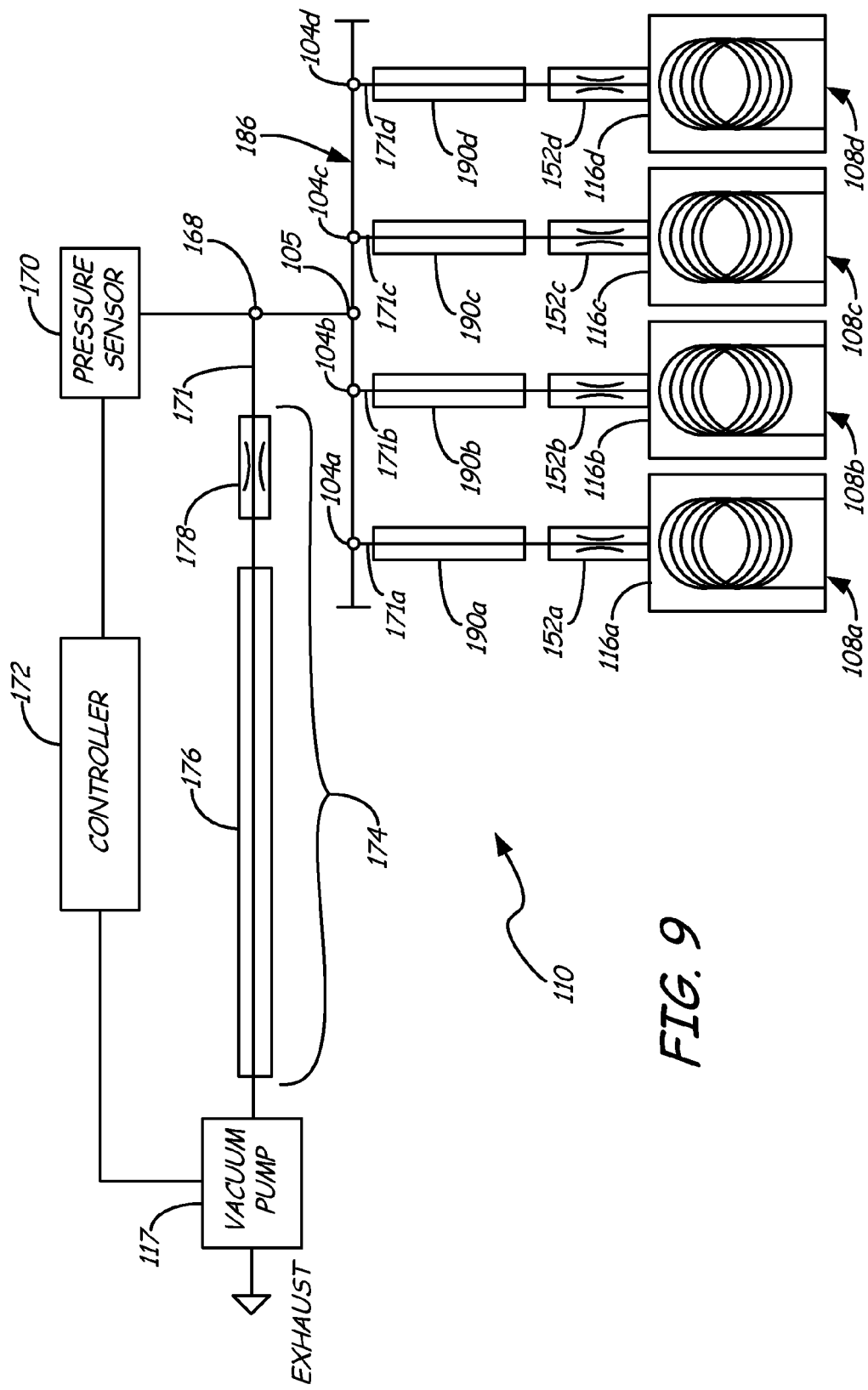
FIG. 9 is a schematic view of a liquid degassing apparatus of the present invention.

To limit or prevent such "cross-contamination" of pervaporated solvent into the degassing chambers, first volume buffer chambers may be disposed between the manifold and the respective degassing chambers. An example embodiment of the present invention is illustrated in FIG. 9, wherein pervaporation control system 110 includes a plurality of liquid degassing apparatus 108a-108d, each including a degassing chamber 116a-116d, and a flow restrictor 152a-152d in similarity to that described above with reference to pervaporation control system 8. However, it is to be understood that degassing apparatus 108a-108d need not be identical, or even similar to one another, nor with degassing apparatus 8. Pervaporation control system 110 further includes a manifold 186 fluidly coupling individual degassing lines 171a-171d with main degassing line 171. Manifold 186 may comprise any suitable configuration for coupling respective degassing lines 171a-171d into a single degassing line 171 for coupling to vacuum pump 117. In one embodiment, manifold 186 may include a combination of tubing and connection joints for establishing the respective degasser connections 104a-104d to manifold 186, and a connection 105 fluidly coupling manifold 186 to degassing line 171. In some embodiments, pervaporation control system 110 includes a pressure sensor 170 for detecting pressure at sensor location 168, a controller 172 for controlling vacuum pump 117 based upon signals generated by pressure sensor 170, and a pneumatic filtration device 174 including a volume exchange chamber 176 and a flow restrictor 178.

As indicated above, pervaporation control system 110 may include first volume buffer chambers 190a-190d fluidly coupled between respective degassing chambers 116a-116d and vacuum pump 117. In the illustrated embodiment, first volume buffer chambers 190a-190d may be fluidly coupled to the respective individual degassing lines 171a-171d between the respective flow restrictors 152a-152d and manifold connections 104a-104d. It is to be understood, however, that pervaporation control system 110 may incorporate one or more volume buffer chambers in any of a variety of arrangements and configurations to suitably inhibit cross-contamination of pervaporated solvent into one or more of the degassing chambers 116a-116d. Therefore, the illustrated embodiment of first volume buffer chambers 190a-190d is merely exemplary, and may specifically alternatively include one or more buffer chambers disposed respectively upstream from flow restrictors 152-152d, or downstream from manifold connections 104a-104d.

In order to effectively inhibit the pervaporated solvent cross-contamination described above, first volume buffer chambers 190a-190d may be appropriately sized and configured to diminish pressure oscillations at respective degassing lines 171a-171d that are caused by the intake/exhaust stroke cycles of vacuum pump 117. In a particular embodiment, the volume of first buffer chambers 190a-190d may be selected to exceed a theoretical intake volume to the respective degassing chamber 116a-116d as a result of the pressure oscillation. The following relationship is used to calculate the theoretical intake volume to each degassing chamber 116a-116d:

$$V_i = (P_o/P_{set}) \cdot V_{ch}$$

Wherein,
$V_i$=intake volume
$P_o$=pump pressure oscillation
$P_{set}$=pressure set point in respective chamber
$V_{ch}$=respective degassing chamber volume In one embodiment, therefore, each of first volume buffer chambers 190a-190d may be configured with a volume which exceeds the respective intake volume ($V_i$). However, it is to be understood that the volumes for first volume buffer chambers 190a-190d may be equal or inequal, and one or more of such first volume buffer chambers 190a-190d may not exceed an intake volume of an associated degassing chamber 116a-116d. In a particular embodiment, buffer chambers 190a-190d may be provided as an added "dead space" volume in the respective degassing lines 171a-171d, and may be provided in any of a variety of configurations, including a separate chamber body fluidly coupled to a respective degassing line 171a-171d, or a widened and/or lengthened degassing line 171a-171d. In one embodiment, the first buffer chamber volume may be in the form of an extended length of a respective degassing line for a total added volume of 0.2-1 ml.

Another embodiment to limit or prevent "cross-contamination" of pervaporated solvent into the degassing chambers is illustrated in FIG. 10, wherein pervaporation control system 210 includes a plurality of liquid degassing apparatus 208a-208d, each including a degassing chamber 216a-216d, and a flow restrictor 252a-252d in similarity to that described above with reference to pervaporation control systems 8, 110.

It is to be understood that degassing apparatus 208a-208d need not be identical, or even similar to one another, nor with degassing apparatus 8, 110. For example, degassing apparatus 210 may or may not include one or more of the components illustrated in FIG. 10. In the illustrated embodiment, however, pervaporation control system 210 includes a manifold 286 fluidly coupling individual degassing lines or outlet conduits 271a-271d with a main degassing line 271. Manifold 286 may comprise any suitable configuration for coupling respective degassing lines 271a-271d into a single degassing line 271 for coupling to vacuum pump 217. In one embodiment, manifold 286 may include a combination of tubing and connection joints for establishing the respective degasser connections 204a-204d to manifold 286, and a connection 205 fluidly coupling manifold 286 to degassing line 271. In some embodiments, pervaporation control system 210 includes a pressure sensor 270 for detecting pressure at sensor location 268, a controller 272 for controlling vacuum pump 217 based upon signals generated by pressure sensor 270, and a pneumatic filtration device 274 including a volume exchange chamber 276 and a flow restrictor 278.

Pervaporation control system 210 may include first volume buffer chambers 290a-290d fluidly coupled between respective degassing chambers 216A-216D and vacuum pump 217. First volume buffer chambers 290a-290d may be substantially as described as above with respect to pervaporation control system 110.

Pervaporation control system 210 may further include second volume buffer chambers 292a-292d fluidly coupled between respective chambers 216a-216d and vacuum pump 217. In the illustrated embodiment, second volume buffer chambers 292a-292d may be fluidly coupled to the individual degassing lines 271a-271d between respective first volume buffer chambers 290a-290d and manifold connections 204a-204d. It is to be understood, however, that pervaporation control system 210 may incorporate one or more second volume buffer chambers in any of a variety of arrangements and configurations to suitably inhibit cross-contamination of pervaporated solvent into one or more of the degassing chambers 216a-216d. Therefore, the illustrated embodiment of second volume buffer chambers 292a-292d is merely exemplary, and may specifically alternatively include volume buffer chambers disposed downstream of manifold connections 204a-204d, and/or without first volume buffer chambers 290a-290d, and/or other arrangements and relative positions of second volume buffer chambers 292a-292d with respect to other components of pervaporation control system 210.

Although significant reduction of pervaporation solvent cross-contamination is achieved in the embodiments described above, "back flow" diffusion of pervaporated solvent can nonetheless occur during periods of a pumping cycle of vacuum pump 217 in which gas within degassing lines 271, 271a-271d and manifold 286 is not actively drawn into vacuum pump 217. Such "non-suction" periods may be defined by a discharge segment of the pumping cycle, as well as portions of an intake segment of the pumping cycle prior to developing a pressure within vacuum pump 217 that is less than the pressure within degassing line 271 (at which time suction into vacuum pump 217 can occur). During the "non-suction" period of vacuum pump 217, degassing and solvent pervaporation continue in degassing chambers 216a-216d. In the event that degassing and/or pervaporation occurs at different rates within the respective degassing chambers 216a-216d, a localized relative high pressure is generated, causing "instantaneous backflow" through manifold 286 to the other degassing lines 271a-271d having relatively lower degassing and/or pervaporation rates, resulting in a relatively lower pressure. In some cases, such instantaneous backflow can include pervaporated solvent that can eventually diffuse into and cross-contaminate other degassing chambers 216a-216d.

For the purposes hereof, the term "combined instantaneous backflow volume" shall mean the following:

$$V_c = P * T_{off}$$

Wherein,
$V_c$=combined instantaneous backflow volume
P=maximum pervaporation flow rate (cm³/min)
$T_{off}$=time portion of each pump cycle without suction applied For the purposes of this application, the term "maximum pervaporation flow rate" means the single greatest pervaporation flow rate from any one of the plurality of degassing chambers 216a-216d.

One proposal to eliminate pervaporated solvent cross-contamination is to position check valves in each individual degassing line 271a-271d. This solution, however, is limited to the availability of check valves which are of materials compatible with the solvent vapors pervaporating in degassing chambers 216a-216d. Many pervaporated solvents are damaging to common check valve materials, such that the employment of check valves has limited applicability. Moreover, check valve cracking pressure and backflow may affect efficiency of cross-contamination reduction.

Another approach in diminishing or eliminating instantaneous backflow solvent cross-contamination is to introduce inlet air flow through an air vent 296 in manifold 286. Inlet air flow is driven by the differential pressure between the total pressure in manifold 286 and the exterior environment, such as the atmospheric pressure. Air vent 296 may take the form of, for example, a capillary tube, sintered frit, an orifice, or other structure which permits air flow at a limited rate therethrough into manifold 286. The vent air flow through vent 296 mitigates pressure differentials among degassing lines 271a-271d, which is the driving force for the instantaneous backflow pervaporation cross-contamination described above. To effectively mitigate pressure differentials among individual degassing lines 271a-271d, the air flow rate through air vent 296 ($R_A$) may exceed the combined average backflow rate of degassing chambers 216a-216d, as follows:

$$R_A = P*(N-1)$$

Wherein,
$R_A$=combined average backflow rate (cm³/min)
P=maximum pervaporation flow rate (cm³/min)
N=number of degassing chambers When multiple chambers are employed in the pervaporation control system, a relatively high air vent flow rate is required, which could limit the degassing efficiency of the system. Moreover, any air flow permitted into the pervaporation control system should not exceed a maximum capacity flow rate, which is defined as a maximum capacity of vacuum pump 217 to maintain a selected pressure set point in degassing chambers 216a-216d that is effective for degassing the liquid compositions passing therethrough. In other words, the "maximum capacity flow rate" is the maximum air inlet flow rate which nonetheless permits vacuum pump 217 to maintain the selected pressure setpoint in permeate sides of the degassing chambers 216a-216d.

An alternative approach may include air vents 296a-296d in each of the individual outlet conduits 271a-271d, as illustrated in FIG. 10. The individual air vents 296a-296d may permit air flow from an exterior environment into the individual outlet conduits 271a-271d, such as at respective connections 297a-297d. As in air vent 296, the individual air vents 296a-296d may permit air inflow to individual outlet conduits 271a-271d through various orifices, including capillary tubes, porous frits, or the like. The air flow rates through the individual air vents 296a-296d may each exceed the maximum pervaporation flow rate from any degassing chamber 216a-216d, as follows:

$$R_1 \geq P * \frac{(N-1)}{N}$$

Wherein,
$R_1$=individual air vent flow rate (cm³/min)

The total air vent flow in this arrangement is designed to be equivalent to the air vent flow through main air vent 296, but divided among the individual air vents 296a-296d. Thus, again, relatively high bleed air flow rate is involved in this solution to diminish or eliminate pervaporated solvent cross-contamination among the degassing chambers 216a-216d.

In the event that $R_A$ or $R_1$ exceed the maximum capacity flow rate of the vacuum pump, or are merely undesirably large, second volume buffer chambers 292a-292d may be positioned in individual outlet conduits 271a-271d as illustrated in FIG. 10 to reduce the air vent flow rate needed to significantly lower or eliminate pervaporated solvent cross-contamination into the degassing chambers 216a-216d. In the illustrated embodiment, second volume buffer chambers 292a-292d are disposed downstream from air vents 296a-296d, though it is contemplated that various configurations and relative positions for second volume buffer chambers 292a-292d may be employed in pervaporation control system 210. The volume of second buffer chambers 292a-292d may be arranged to exceed an individual instantaneous backflow volume to respective degassing chamber 216a-216d as a result of differential pervaporation flow rates. The following relationship is used to calculate the individual instantaneous backflow volume to each degassing chamber 216a-216d where a selected individual air vent flow rate ($R_s$) is less than the maximum pervaporation flow rate from any degassing chamber:

$$V_b = \left(P - R_s * \frac{N}{N-1}\right) * \frac{T_{off}}{N-1}$$

Wherein,
$Y_b$=individual instantaneous backflow volume
$T_{off}$=time portion of each pump cycle without suction applied $$R_s < P * \frac{(N-1)}{N}$$

As the selected individual flow rate ($R_s$) approaches or exceeds the individual air flow rate ($R_1$) as calculated above, the necessary volume of the second buffer chamber 292a-292d reaches zero, and theoretically becomes negative. Such zero volume second buffer chambers 292a-292d are attained where air vent flow rates $R_A$, $R_1$ exceed the maximum pervaporation flow rates, and can do so without deteriorating the effectiveness of the vacuum degassing system.

In typical arrangements for a pervaporation control system, such as system 210, the $T_{off}$ of vacuum pump 217 is greater than one half of the pump cycle time, due to the intake segment of the pump cycle not performing suction on the degassing line 271 until the pressure in the headspace of vacuum pump 217 is less than the pressure within degassing line 271. In some cases, $T_{off}$ may be 80-90% of a complete cycle time for vacuum pump 217.

Each of second volume buffer chambers 292a-292d may therefore be configured with a volume which exceeds the respective individual instantaneous backflow volume ($V_b$). However, it is to be understood that the volume for second volume buffer chambers (292a-292b) may be equal or inequal, and one or more of such second volume buffer chambers 292a-292d may not exceed an instantaneous backflow volume of an associated outlet conduit 271a-271d. Second volume buffer chambers 292a-292b may be provided as an added "dead space" volume in the respective outlet conduits 271a-271d, and may be provided in any of a variety of configurations, including a separate chamber body fluidly coupled to a respective outlet conduit 271a-271d, or a widened and/or lengthened outlet conduit 271a-271d.

Through the incorporation of second volume buffer chambers 292a-292d, the necessary air vent flow rate $R_s$ may be reduced to substantially less than the air vent flow rate $R_1$, so that the vacuum pump is capable of accommodating the bleed air flow without compromising degassing performance. The following relationship clarifies the necessary air vent flow rate with a selected second volume buffer chamber volume ($V_s$) which exceeds the individual instantaneous backflow volume ($V_b$);

$$R = P - V_s \cdot (N-1) \cdot \left(\frac{(N-1)}{N \cdot T_{off}}\right)$$

Wherein, $V_s \geq V_b$

R=necessary air vent flow rate to substantially reduce or eliminate pervaporated solvent cross-contamination The volumes and flow rates described in the relationships above assume "slug" flow regimes of the pervaporated solvent, and do not take into account backflow diffusion and flow mixing phenomenon. It may therefore be appropriate to increase the calculated volumes/flows by 2-5× in order to enhance the confidence level that pervaporation cross-contamination through backflow diffusion and flow mixing is minimized or prevented altogether.

EXAMPLE

A pervaporation control system includes first and second degassing chambers, each having a volume of 11 cm³, and a membrane in the form of tubing with a total length of about 65 cm. Pressure in the system is set to 50 mm Hg. The first chamber operates with an aqueous solvent mobile phase, while the second chamber operates with acetonitrile (ACN) solvent mobile phase in a low flow condition. Under such conditions, ACN has about 30 micro liter/hour permeability, while the aqueous solvent in the first chamber has nearly zero permeability. The ACN permeability in the second chamber leads to about 0.2 SCCM (or about 3 CCM at 50 mm Hg).

The vacuum pump operates at 15 RPM, with a $T_{off}$ of 90% of the cycle time, resulting in a $T_{off}$ of about 3.6 seconds per cycle. Consequently, during the non suction portion of the vacuum pump cycle (about 3.6 seconds), about 0.18 cc of ACN vapor is pervaporated into the system from the second degassing chamber, to result in about 0.09 cc of ACN vapor per chamber of the system. To prevent cross-contamination into the first degassing chamber, a second volume buffer chamber is provided that is equal to or greater than the individual instantaneous backflow volume (0.09 cc) available to cross-contaminate the first degassing chamber. The second volume buffer chamber therefore exhibits a volume of 0.2-0.5 cc.

To further reduce or eliminate any cross-contamination of pervaporated ACN vapor into the first degassing chamber, air vents are added to each degassing line allowing continuous air purging of the second volume buffer chambers. The air flow permitted through the air vents is less than the vacuum pump's maximum capability to maintain the pressure set point of the system, and may be equal to or slightly greater than the ACN vapor flow rate per chamber (0.1 SCCM or 1.5 CCM at 50 mm Hg). The air vents employed in this example constitute capillary tubes coupled to an orifice in the respective degassing lines, with the capillary tubes having an inside diameter of 0.01 in, and a length of 0.5 in. Such air vents resulted in air flow therethrough of about 0.1-0.3 SCCM.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A liquid degassing apparatus, comprising:
a plurality of degassing modules for degassing respective liquid compositions, each of said degassing modules including a chamber separated by a gas-permeable, liquid-impermeable membrane into a permeate side and a retentate side, wherein said retentate sides of said chambers are liquidly disconnected from one another;
a manifold fluidly connecting said permeate sides of said chambers through outlet conduits individually extending between said manifold and respective vacuum ports in fluid communication with said permeate sides of said chambers, said manifold further fluidly connecting said outlet conduits with a main degassing line at a connection;
a vacuum pump fluidly coupled to said main degassing line for evacuating said permeate sides of said chambers to a pressure set point; and
an air vent permitting air flow into said apparatus between said connection and said chambers at an inflow rate that is equal to or greater than a combined average backflow rate of said plurality of degassing modules, but not exceeding a maximum capacity flow rate defining a maximum capacity of said vacuum pump for maintaining said pressure set point.

2. A liquid degassing apparatus as in claim 1 wherein said inflow rate is determined by:

$R_b \geq P^*(N-1)$

Wherein,
$R_b$=inflow rate for said air vent;
P=a maximum pervaporation flow rate among said degassing modules; and
N=number of degassing modules.

3. A liquid degassing apparatus as in claim 1, including a plurality of air vents together permitting air flow into said apparatus at said inflow rate.

4. A liquid degassing apparatus as in claim 3 wherein said air vents permit air flow into each of said outlet conduits.

5. A liquid degassing apparatus as in claim 4 wherein said inflow rate for each of said plurality of air vents is determined by:

$$R_1 \geq P * \frac{N-1}{N}$$

Wherein,
$R_1$=inflow rate for each of said air vents;
P=a maximum pervaporation flow rate among said degassing modules; and
N=number of degassing modules.

6. A liquid degassing apparatus as in claim 4, including a first buffer chamber fluidly interposed between at least one of said air vents and at least one of said degassing modules within a respective outlet conduit, said first buffer chamber defining a first volume open to said outlet conduit, which first volume is of a magnitude exceeding an intake volume, wherein said intake volume is defined as:

$$V_I = (P_0/P_{set}) \cdot V_{ch}$$

wherein,
$V_I$=intake volume;
$P_0$=pump pressure oscillation of said pressure pump;
$P_{set}$=said pressure set point; and
$V_{ch}$=a volume of said respective degassing module chamber.

7. A liquid degassing apparatus as in claim 6, including a second buffer chamber downstream of at least one of said air vents, said second buffer chamber defining a second volume of a magnitude equal to or greater than a combined instantaneous backflow volume.

8. A liquid degassing apparatus as in claim 7, including a plurality of said second buffer chambers associated with respective outlet conduits of said degassing modules, said second buffer chambers each defining an individual second volume of a magnitude equal to or greater than said combined instantaneous backflow volume to said respective outlet conduit.

9. A liquid degassing apparatus as in claim 8 wherein said individual second volume is determined as:

$$V \geq \left(P - R_s * \frac{N}{N-1}\right) * \frac{T_{off}}{N-1}$$

Wherein,
V=individual second volume;
P=a maximum pervaporation flow rate among said degassing modules;
$R_s$=inflow rate for each of said air vents;
$T_{off}$=portion of a cycle time of said vacuum pump in which suction is not drawn upon said main degassing line;
N=number of degassing modules.

10. A method for controlling liquid pervaporation in a liquid degassing system having a plurality of degassing modules, each including a chamber separated by a gas-permeable, liquid-impermeable membrane into a permeate side and a retentate side, wherein said retentate sides of said chambers are liquidly disconnected from one another, and an outlet conduit extending from each of said plurality of degassing modules, said outlet conduits fluidly coupling respective permeate sides of said chambers to each other and to a vacuum pump at a connection, said method comprising:

(a) delivering liquid compositions to said retentate sides of said chambers, wherein a first liquid composition delivered to a first chamber is different from a second liquid composition delivered to a second chamber;
(b) operating said vacuum pump to evacuate said retentate sides to a pressure set point that results in a liquid vapor pervaporation flow through a respective said membrane in at least one of said first and second chambers;
(c) counteracting the liquid vapor pervaporation flow to prevent infiltration of the pervaporation flow into another of said chambers, including by permitting air flow into said system between said connection and said chambers at an inflow rate.

11. A method as in claim 10 wherein said inflow rate is equal to or greater than a combined average backflow rate of said plurality of said degassing modules, but not exceeding a maximum capacity flow rate defining a maximum capacity of said vacuum pump for maintaining said pressure set point.

12. A method as in claim 11 wherein said inflow rate is determined by:

$$R_b \geq P*(N-1)$$

Wherein,
$R_b$=inflow rate for said air vent;
P=a maximum pervaporation flow rate among said degassing modules; and
N=number of degassing modules.

13. A method as in claim 11, including a plurality of air vents together permitting air flow into said apparatus at said inflow rate.

14. A method as in claim 13 wherein said air vents permit air flow into each of said outlet conduits.

15. A method as in claim 14 wherein said inflow rate for each of said plurality of air vents is determined by:

$$R_1 \geq P * \frac{N-1}{N}$$

Wherein,
$R_1$=inflow rate for each of said air vents;
P=a maximum pervaporation flow rate among said degassing modules; and
N=number of degassing modules.

16. A method for controlling liquid pervaporation in a liquid degassing system having a plurality of degassing modules, each including a chamber separated by a gas-permeable, liquid-impermeable membrane into a permeate side and a retentate side, wherein said retentate sides of said chambers are liquidly disconnected from one another, and an outlet conduit extending from each of said plurality of degassing modules, said outlet conduits fluidly coupling respective permeate sides of said chambers to each other and to a vacuum pump at a connection, said method comprising:

(a) delivering liquid compositions to said retentate sides of said chambers, wherein a first liquid composition delivered to a first chamber is different from a second liquid composition delivered to a second chamber;
(b) operating said vacuum pump to evacuate said retentate sides to a pressure set point that results in a liquid vapor pervaporation flow through a respective said membrane in at least one of said first and second chambers;
(c) counteracting the liquid vapor pervaporation flow to prevent infiltration of the pervaporation flow into another of said chambers, wherein said counteracting includes interposing a first buffer chamber in fluid communication between said first and second chambers, said first buffer chamber defining a first volume open to at least one of said outlet conduits of said first and second chambers, which first volume is of a magnitude exceeding an intake volume, wherein said intake volume is defined as:

$$V_I = (P_0/P_{set}) \cdot V_{ch}$$

wherein,
$V_I$ = intake volume;
$P_0$ = pump pressure oscillation of said pressure pump;
$P_{set}$ = said pressure set point; and
$V_{ch}$ = a volume of said respective degassing module chamber.

17. A method as in claim 16 wherein said counteracting includes interposing a second buffer chamber in fluid communication between said first and second chambers, said second buffer chamber defining a second volume open to at least one of said outlet conduits of said first and second chambers, which second volume is of a magnitude equal to or greater than a combined instantaneous backflow volume.

18. A method as in claim 17, including a plurality of said second buffer chambers associated with respective outlet conduits of said degassing modules, said second buffer chambers each defining an individual second volume of a magnitude equal to or greater than said combined instantaneous backflow volume to said respective outlet conduit.

* * * * *